US012723668B2

(12) United States Patent
Guo et al.

(10) Patent No.: US 12,723,668 B2
(45) Date of Patent: Sep. 1, 2026

(54) CONNECTING VALVE AND COMBUSTION APPLIANCE

(71) Applicant: Chant Heat Energy Science & Technology (Zhongshan) Co., Ltd., Zhongshan (CN)

(72) Inventors: Weizhao Guo, Zhongshan (CN); Dingjie Liang, Zhongshan (CN); Xianmin Deng, Zhongshan (CN); Guangzhi Mai, Zhongshan (CN)

(73) Assignee: Chant Heat Energy Science & Technology (Zhongshan) Co., Ltd., Zhongshan (CN)

(*) Notice: Subject to any disclaimer, the term of this patent is extended or adjusted under 35 U.S.C. 154(b) by 0 days.

(21) Appl. No.: 19/078,299

(22) Filed: Mar. 13, 2025

(65) Prior Publication Data

US 2026/0063215 A1 Mar. 5, 2026

(30) Foreign Application Priority Data

Sep. 5, 2024 (CN) ......................... 202411245707.9
Sep. 5, 2024 (CN) ......................... 202422182867.5

(51) Int. Cl.
*F16K 15/06* (2006.01)
*F17C 13/04* (2006.01)

(52) U.S. Cl.
CPC ............ *F16K 15/066* (2013.01); *F17C 13/04* (2013.01); *F17C 2201/0104* (2013.01); *F17C 2205/0323* (2013.01); *F17C 2205/0382* (2013.01)

(58) Field of Classification Search
CPC .............. F17C 13/04; F17C 2201/0104; F17C 2205/0323; F17C 2205/0382; F16K 15/066
See application file for complete search history.

(56) References Cited

U.S. PATENT DOCUMENTS

2006/0137747 A1* 6/2006 Duex .................... F16K 15/066 137/512

* cited by examiner

*Primary Examiner* — P. Macade Nichols

(57) ABSTRACT

A connecting valve includes: a valve body, a first input port, a second input port, and a circulation chamber, wherein the gas output channel is in communication with the circulation chamber through a connecting opening; a first communicating structure, comprising a connecting assembly and a sealing assembly, wherein the connecting assembly is provided at the first input port of the valve body, the sealing assembly is slidably provided with respect to a chamber wall of the circulation chamber, the first input port is capable of being opened by a gas pressure of the gas in the first gas cylinder, so that a first gas is delivered into gas output channel; and a second communicating structure the second input port is capable of being opened by the gas pressure of the gas in the second gas cylinder, so that a second gas is delivered into the gas output channel.

20 Claims, 13 Drawing Sheets

CONNECTING VALVE AND COMBUSTION APPLIANCE

CROSS REFERENCE TO RELATED APPLICATIONS

The present disclosure claims the priority of Chinese Patent Application No. 2024112457079 filed on Sep. 5, 2024 before CNIPA, and Chinese Patent Application No. 2024221828675 filed on Sep. 5, 2024 before CNIPA. All the above are hereby incorporated by reference in their entirety.

TECHNICAL FIELD

The present disclosure relates to the technical field of valves, and in particular to a connecting valve and a combustion appliance.

BACKGROUND

Combustion appliances require a valve to control the on-off of gas delivery in use, the valve is mounted on the main body of the appliance, but the valve of the prior art can only be connected to a gas cylinder for gas supply, so that the gas supply can only adapt to the limited types of gas cylinders, which is not convenient for the use of the combustion appliances.

SUMMARY

To address at least one of the existing problems according to the aforementioned prior art, in accordance with an aspect of the present disclosure, provided is a connecting valve, including:

- a valve body, provided with a gas output channel, a first input port, a second input port, and a circulation chamber, in which the gas output channel is in communication with the circulation chamber through a connecting opening, and the first input port and the second input port are located at two ends of the circulation chamber along an axial direction of the valve body;
- a first communicating structure, including a connecting assembly and a sealing assembly, wherein the connecting assembly, configured to connect a first gas cylinder, is provided at the first input port of the valve body, the sealing assembly, configured to seal the first input port, is slidably provided with respect to a chamber wall of the circulation chamber and the connecting assembly, the first input port is capable of being opened by a gas pressure of the gas in the first gas cylinder, so that a first gas is delivered into the gas output channel; and
- a second communicating structure, mounted at the second input port, configured to connect a second gas cylinder, the second input port is capable of being opened by the gas pressure of the gas in the second gas cylinder, so that a second gas is delivered into the gas output channel.

In some implementations, the sealing assembly includes a sliding rod and a first elastic member, the sliding rod is slidably provided with respect to the chamber wall of the circulation chamber and is configured to be abutted against the connecting assembly, so as to seal the first input port, the first elastic member abuts between the sliding rod and the chamber wall of the circulation chamber or between the sliding rod and the second communicating structure, configured to apply a resisting force to the sliding rod.

In some implementations, the circulation chamber includes a first segment, a second segment, and a third segment that are in communication sequentially, an orifice diameter of the second segment is less than that of the first segment and the third segment respectively, the first segment is provided with a first input port, the third segment is provided with a second input port, the connecting opening is provided at any one of the first segment, the second segment, or the third segment, and

- the first elastic member is abutted against an end of the first segment.

In some implementations, the first segment includes a first part and a second part, the first part includes the first input port, a diameter of the first part is greater than that of the second part, the connecting opening is provided at any one of the second part, the second segment, or the third segment,

- the sealing assembly further includes a first sealing ring, the first sealing ring is sleeved onto the sliding rod and configured to be abutted against an end of the first part connected to the second part when a gas pressure inside the first gas cylinder is greater than a preset value, so as to prevent gas from flowing to the connecting opening.

In some implementations, the sliding rod includes an abutment head and a rod part, a diameter of a side of the abutment head facing the rod part is greater than that of the rod part, the abutment head is slidably provided within the first part, the rod part is slidably provided within the first part and the second part, the rod part is provided with a limit ring, the first sealing ring is snapped between the abutment head and the limit ring, and the first elastic member abuts between the limit ring and an end of the second part.

In some implementations, an outer diameter of an end of the abutment head facing the connecting assembly is gradually decreased in a direction toward the connecting assembly.

In some implementations, the abutment head includes a constant diameter segment and a variable diameter segment constant diameter segment is connected between the variable diameter segment part, an outer diameter of the variable diameter segment is gradually decreased in a direction toward the connecting assembly, and the constant diameter segment is provided with a venting channel extending in an axial direction of the valve body.

In some implementations, the venting channel communication outer wall of the constant diameter segment.

In some implementations, the connecting assembly includes an outer mounting member and a second sealing ring outer mounting member is connected to an end and configured to connect the first gas the second sealing ring abuts between the outer mounting member and the inner wall of the first input port the second sealing ring is configured to be abutted against the sealing assembly.

In some implementations, the first gas cylinder includes a first body and a first nozzle, the outer mounting member is provided with a feed-through hole, the first body is connected to the outer mounting member, the first nozzle is threaded through the feed-through hole,

- the connecting assembly further includes an inner mounting member and a third sealing ring, the inner mounting member is provided on the chamber wall of the feed-through hole and configured to be sleeved outside a port of the first gas cylinder, the third sealing ring and the second sealing ring are provided at two opposite sides of the inner mounting member respectively, and the third sealing ring is configured to sleeved outside the first nozzle.

In some implementations, the second communicating structure includes a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

In some implementations, the fusing member is in threaded connection with the connecting member.

In some implementations, the connecting member includes a mounting segment and a connecting segment, the mounting segment is connected to the valve body, the connecting segment is configured to connect the second gas cylinder, a diameter of the mounting segment is greater than that of the connecting segment, the second communicating structure further includes a fourth sealing ring, and the fourth sealing ring is sleeved outside the plunger and configured to be abutted against an end of the mounting segment facing the connecting segment.

In accordance with another aspect of the present disclosure, provided is a combustion appliance, including the aforementioned connecting valve.

In summary, the connecting valve and the combustion appliance provided in the present disclosure offer the following technical effects:

By providing two communicating structures on two ends of the valve body, i.e., the first communicating structure and the second communicating structure, in such an arrangement, can be connected to different gas cylinders through the first communicating structure and the second communicating structure respectively, and the gas is delivered to the combustion appliance through the gas output channel, so that the utility of the connecting valve can be enhanced to meet the use of a variety of gas cylinders by connecting different gas cylinders.

LABELS

Figure 1:
FIG. 1 is a schematic structural diagram of the first gas cylinder of an embodiment in the present disclosure.
Figure 1:
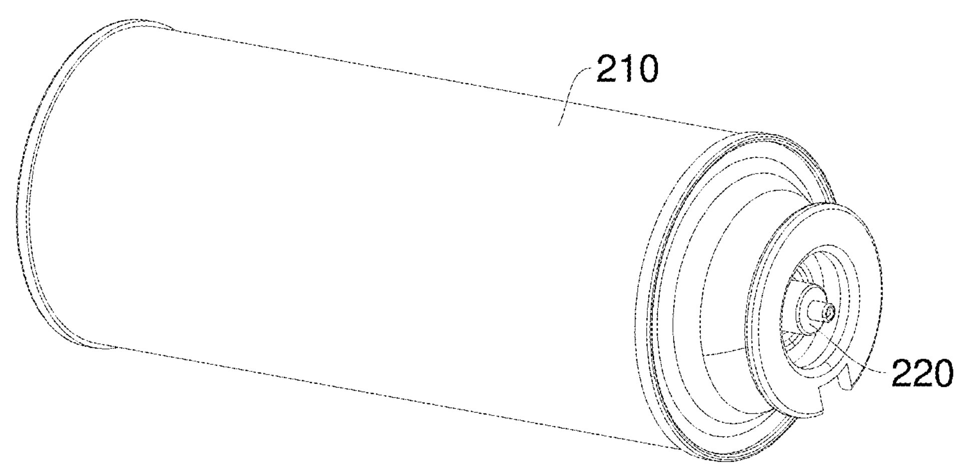
Figure 2:
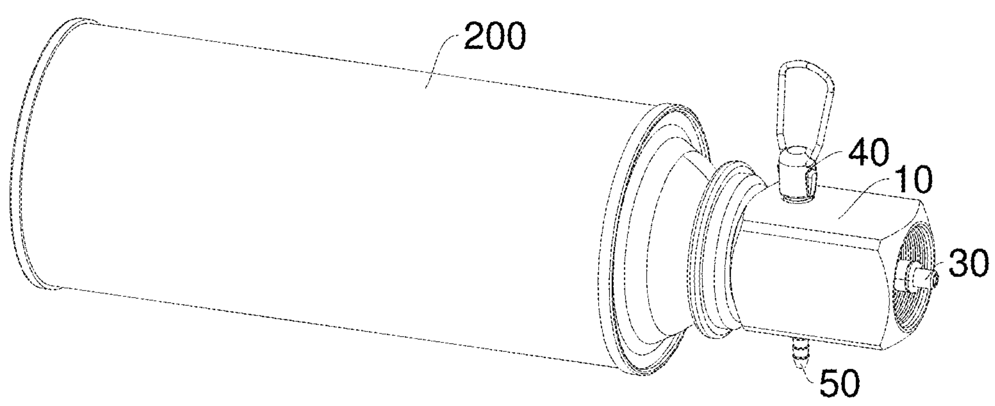
FIG. 2 is a state of use reference diagram of the first gas cylinder in FIG. 1.

100 connecting valve, 10 valve body, 11 gas output channel, 12 first input port, 13 second input port, 14 circulation chamber, 141 first segment, 1411 first wall surface, 1412 first part, 1413 second part, 1414 third wall surface, 142 second segment, 143 third segment, 1431 second wall surface, 1432 first inner thread, 15 connecting opening, 16 mounting notch, 20 first communicating structure, 21 connecting assembly, 211 outer mounting member, 2111 feedthrough hole, 212 inner mounting member, 213 second sealing ring, 214 third sealing ring, 22 sealing assembly, 221 sliding rod, 222 first elastic member, 223 first sealing ring, 224 abutment head, 2241 venting channel, 2242 constant diameter segment, 2243 variable diameter segment, 225 rod part, 226 limit ring, 30 second communicating structure, 31 connecting member, 311 first outer thread, 312 second inner thread, 313 mounting segment, 314 connecting segment, 32 plunger, 33 second elastic member, 34 fusing member, 341 second outer thread, 35 fourth sealing ring, 40 switch structure, 50 connection plug, 200 first gas cylinder, 210 first body, 220 first nozzle, 300 second gas cylinder, 310 second body, 320 second nozzle, 330 airtight core.

DETAILED DESCRIPTION

For a better understanding and implementation, the technical solutions in the embodiments of the present disclosure are clearly and completely described below in conjunction with the attached drawings of the present disclosure.

In the description of the present disclosure, it is to be noted that the terms “up”, “down”, “front”, “back”, “left”, “right”, “vertical”, “horizontal”, “top”, “bottom”, “inside”, “outside” and other orientation or position relationships are based on the orientation or position relationships shown in the attached drawings. It is only intended to facilitate description of the present disclosure and simplify description, but not to indicate or imply that the referred device or element has a specific orientation, or is constructed and operated in a specific orientation. Therefore, they should not be construed as a limitation of the present disclosure.

Unless otherwise defined, all terms including technical and scientific terms used herein have the same meaning as commonly understood by those skilled in the art to which the present disclosure belongs. The terms used herein in the specification of the present disclosure are used only to describe specific embodiments and are not intended as a limitation of the disclosure.

The present disclosure is described in further detail below in conjunction with the accompanying drawings.

Referring to FIGS. 1-16, provided is the connecting valve 100 according to an embodiment of the present disclosure, including a valve body 10, a first communicating structure 20, and a second communicating structure 30.

Referring to FIGS. 1-9, the valve body 10 is provided with a gas output channel 11, a first input port 12, a second input port 13, and a circulation chamber 14. The gas output channel 11 is in communication with the circulation chamber 14 through a connecting opening 15, the first input port 12 and the second input port 13 are located at two ends of the circulation chamber 14 in an axial direction of the valve body 10. A first communicating structure 20 includes a connecting assembly 21 and a sealing assembly 22, in which the connecting assembly 21, configured to connect a first gas cylinder 200, is provided at the first input port 12 of the valve body 10, the sealing assembly 22, configured to seal the first input port 12, is slidably provided with respect to a chamber wall of the circulation chamber 14 and the connecting assembly 21, the first input port 12 is capable of being opened by a gas pressure of the gas in the first gas cylinder 200, so that a first gas is delivered into the gas output channel 11. A second communicating structure 30 is mounted at the second input port 13, configured to connect a second gas cylinder 300, the second input port 13 is capable of being opened by the gas pressure of the gas in the second gas cylinder 300, so that a second gas is delivered into the gas output channel 11.

According to the aforementioned connecting valve 100, by providing two communicating structures on two ends of the valve body 10, i.e., the first communicating structure 20 and the second communicating structure 30, in such an arrangement, can be connected to different gas cylinders through the first communicating structure 20 and the second communicating structure 30 respectively, and the gas is delivered to the combustion appliance through the gas output channel 11, so that the utility of the connection valve 100 can be enhanced to meet the use of a variety of gas cylinders by connecting different gas cylinders.

Referring to FIGS. 7, 9, and 12 to 14, according to the present embodiment, the sealing assembly 22 includes a sliding rod 221 and a first elastic member 222, the sliding rod is slidably provided with respect to a chamber wall of the circulation chamber 14 and is configured to be abutted against the connecting assembly 21, so as to seal the first input port 12; and the first elastic member 222, configured to apply an abutting force to the sliding rod, abuts between the sliding rod 221 and the chamber wall of the circulation chamber 14 or between the sliding rod 221 and the second communicating structure 30. In such an arrangement, when the second input port 13 is in use and the first input port 12 is not in use, under the action of an elastic force of the first elastic member 222, an end of the sliding rod 221 is abutted against the connecting assembly 21, at which time the gas discharged through the second gas cylinder 300 cannot flow into the first input port 12. An end of the second gas cylinder 300 is in a closed state when the first input port 1 is in use. Under the gas pressure action of the gas of the first gas cylinder 200, the first elastic member 222 is compressed, the sliding rod 221 is slid towards the second input port 13 and disengaged from the connecting assembly 21. Then, the gas flows in through a through-hole of the connecting assembly 21 and flows between the sliding rod 221 and the chamber wall of the circulation chamber 14, enters the connecting opening 15, and finally flows out through the gas output channel 11.

Figure 7:
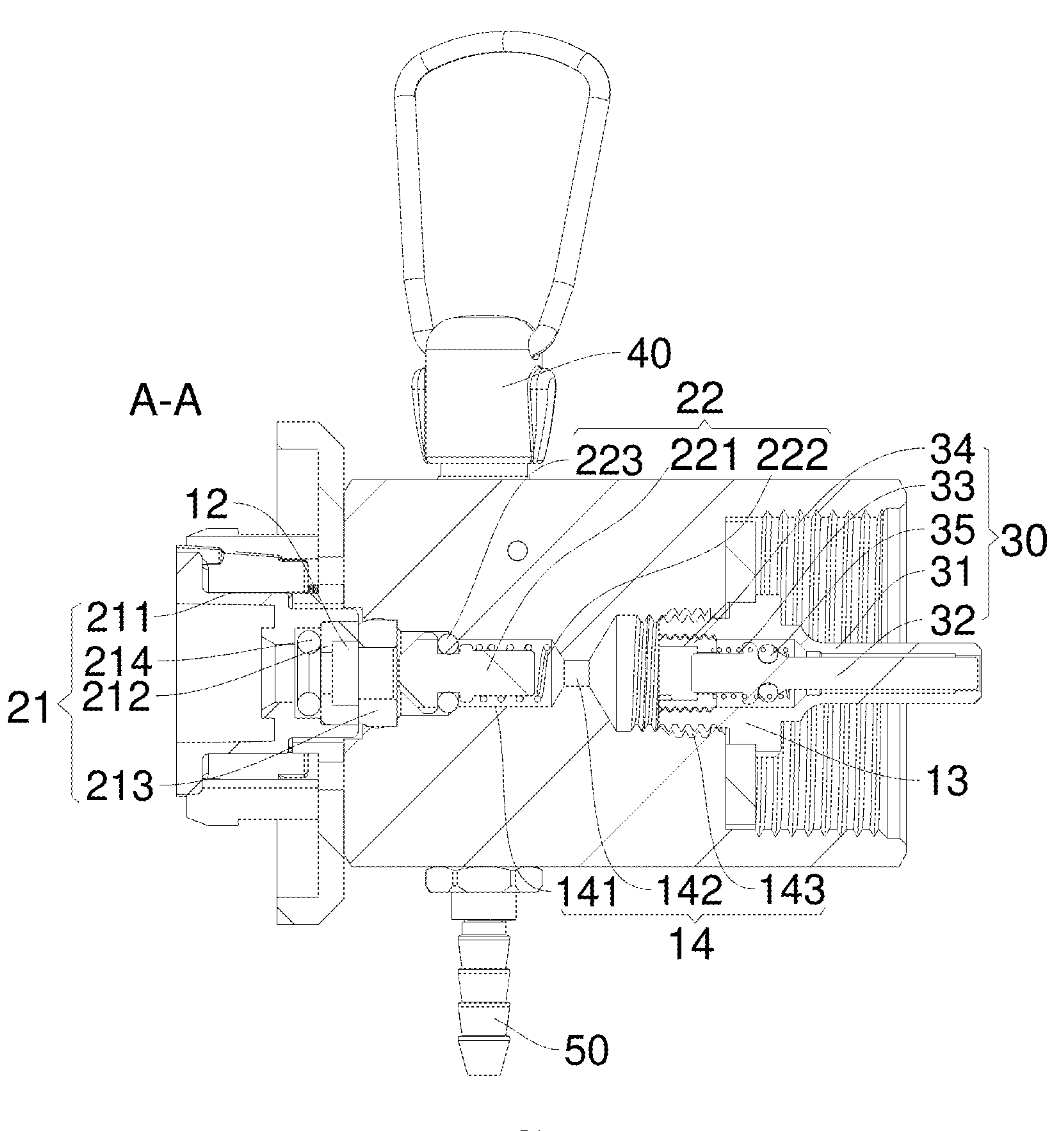
FIG. 7 is a schematic diagram illustrating a sectional view of FIG. 6 taken along line A-A.
Figure 8:
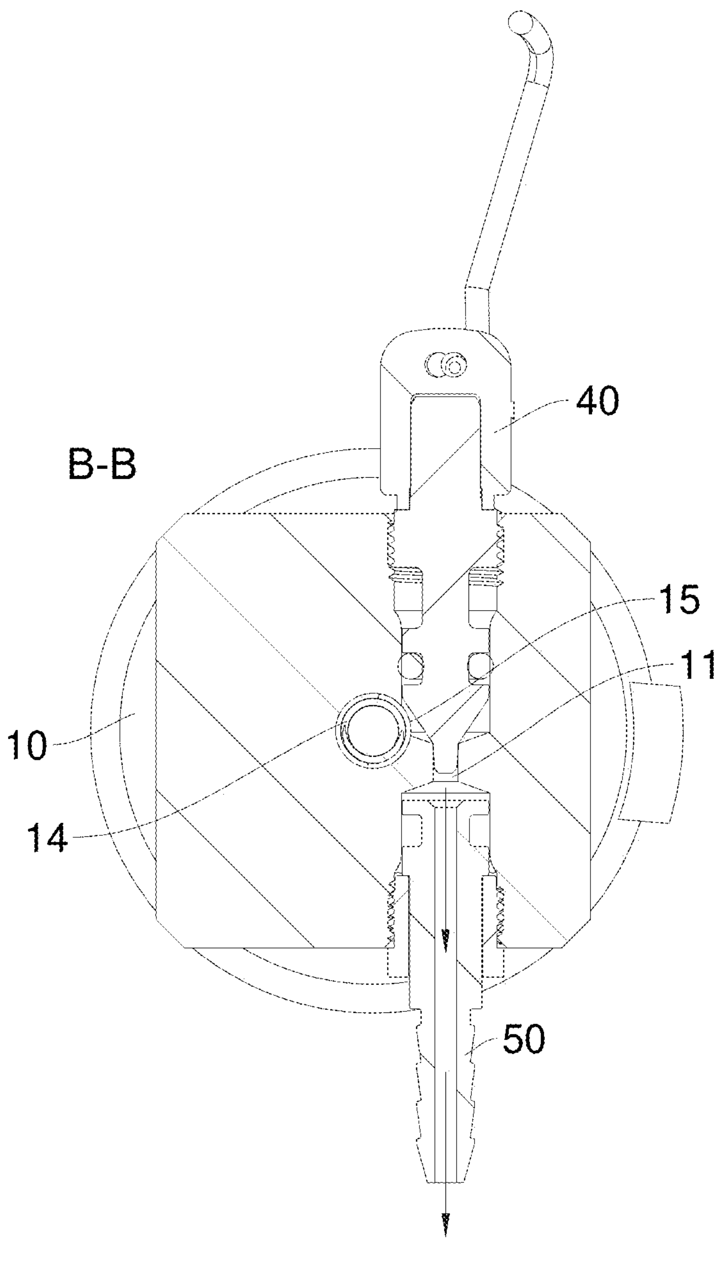
FIG. 8 is a schematic diagram illustrating a sectional view of FIG. 6 taken along line B-B.
Figure 9:
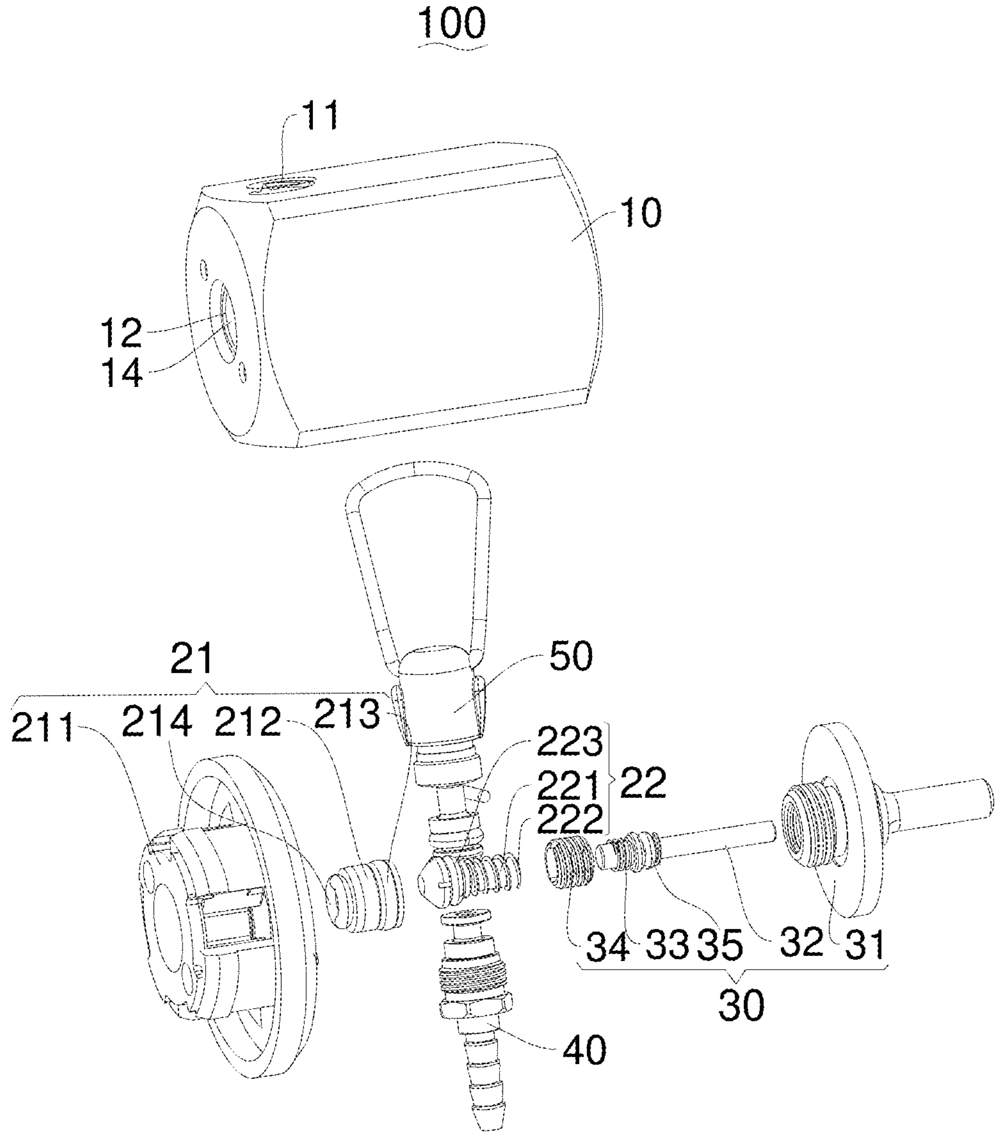
FIG. 9 is a schematic diagram illustrating an exploded view of the connecting valve of FIG. 5.
Figure 10:
FIG. 10 is a top view of the valve body in FIG. 5.
Figure 10:
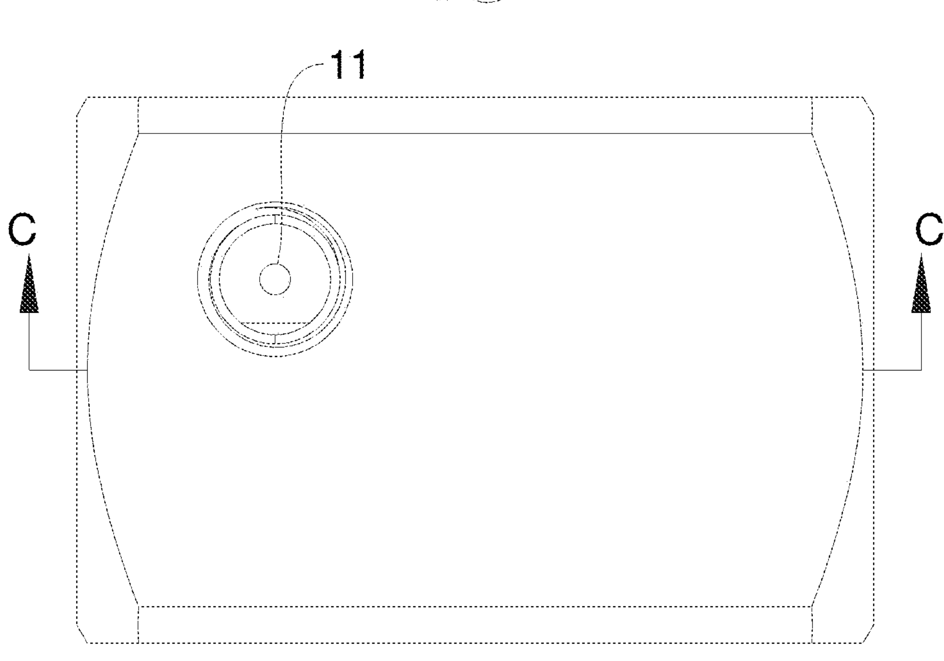
Figure 11:
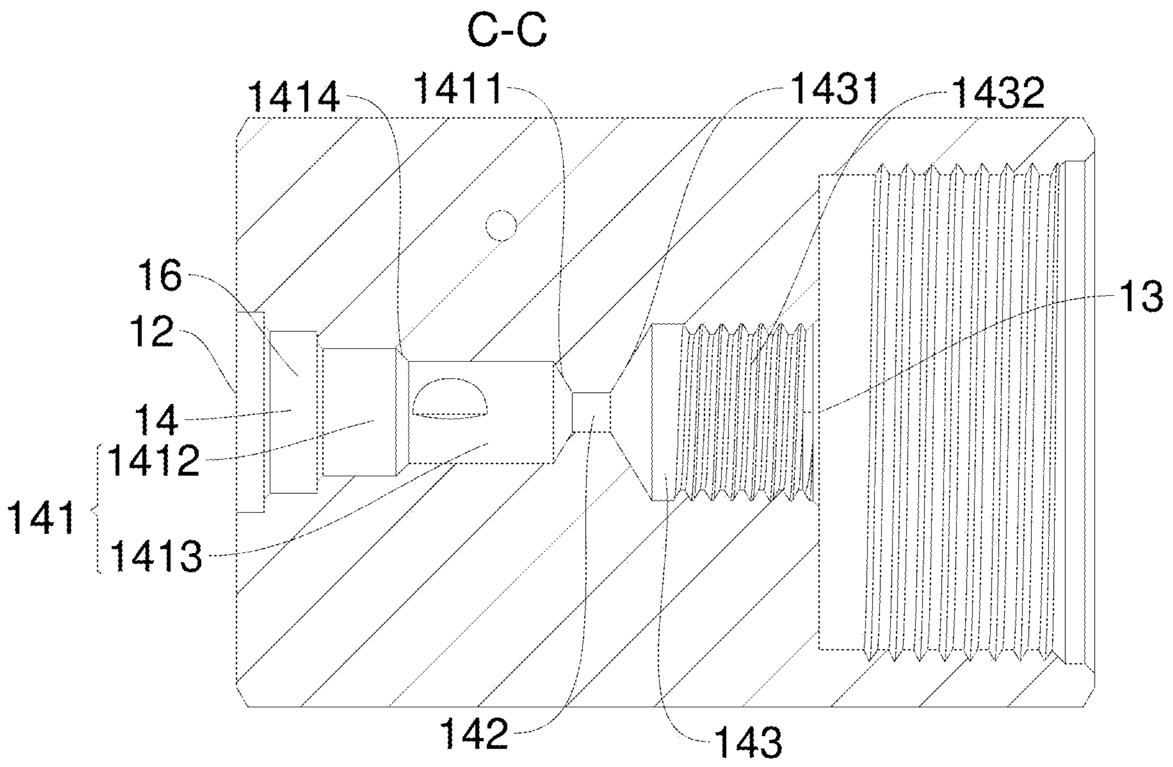
FIG. 11 is a schematic diagram illustrating a sectional view of FIG. 10 taken along line C-C.

Referring to FIGS. 7, 10, and 11, for facilitating the mounting and use of the first elastic member 222, the circulation chamber 14 includes a first segment 141, a second segment 142, and a third segment 143 that are in communication sequentially, an orifice diameter of the second segment 142 is less than that of the first segment 141 and the third segment 143 respectively, the first segment 141 is provided with a first input port 12, the third segment 143 is provided with a second input port 13, the first elastic member 222 is abutted against an end of the first segment 141, so that the setting of the orifice diameter of the second segment 142 being less than that of the first segment 141 and the third segment 143 respectively enables an end of the first segment 141 toward the second segment 142 to form a first wall surface 1411 and enables an end of the third segment 143 toward the second segment 142 to have a second wall surface 1431. In such an arrangement, the first wall surface 1411 and the second wall surface 1431 may be configured to be abutted against the sealing assembly 22 and the second communicating structure 30 respectively, so as to limit a further movement of the sealing assembly 22 and the first communicating structure 20. That is, an opposite end of the first elastic member 222 is abutted against the first wall surface 1411 of the first segment 141, so as to allow for a setting of a relatively short first elastic member 222, which facilitates a quick compression on the first elastic member 222 under the gas pressure action of the gas in the first gas cylinder 200.

The connecting opening 15 may be provided at the first segment 141, the second segment 142, or the third segment 143. Specifically, corresponding to the connecting valve 100 of the present embodiment, the connecting opening 15 is provided at the first segment 141. Since the diameter of the first segment 141 is greater than that of the second segment 142, it is convenient to provide a gas output channel 11 with a relatively short diameter, which can achieve the connection between the gas output channel 11 and the first segment 141. In other embodiments, the connecting opening 15 may be provided at the second segment 142 or the third segment 143, which is not limited herein.

When setting the connecting opening 15 at the first segment 141, the sliding rod 221 is slid towards the second segment 142 so as to open the first gas cylinder 200, the gas in the first gas cylinder 200 can output along the first input port 12 of the first segment 141, and flow through the connecting opening 15 into the gas output channel 11, and output through the gas output channel 11. When the second gas cylinder 300 is required to output the gas, the sliding rod 221 seals the first gas cylinder 200, the gas pressure in the second gas cylinder 300 opens the second communicating structure 30, the second gas flows through the third segment 143, the second segment 142, and into the first segment 141 sequentially, so as to flow into the gas output channel 11 through the connecting opening 15, and output through the gas output channel 11.

Further, for ensuring a normal operation of the valve body 10, the first segment 141 includes a first part 1412 and a second part 1413, the first part 1412 includes the first input port 12, a diameter of the first part 1412 is greater than that of the second part 1413, the connecting opening 15 is provided at any one of the second part 1413, the second segment 142, or the third segment 143. The sealing assembly 22 further includes a first sealing ring 223, the first sealing ring 223 is sleeved onto the sliding rod 221 and configured to be abutted against an end of the first part 1412 connected to the second part 1413 when a gas pressure inside the first gas cylinder 200 is greater than a preset value, so as to prevent gas from flowing to the connecting opening 15. In such an arrangement, when the gas output channel 11 is completely in communication with the outside due to misoperation, since the gas in the first gas cylinder 200 can be discharged smoothly, the outflow pressure of the gas is increased, at which time it is possible to further push the sliding rod 221 in the circulation chamber 14, and the sliding rod 221 continues to slide in a direction of the second communicating structure 30, thereby driving the first sealing ring 223 to slide and be abutted against an end of the first part 1412 connected to the second part 1413, i.e., abutted against a third wall surface 1414 of the first part 1412 facing the second part 1413. In such an arrangement, since the connecting opening 15 is not provided on the first part 1412, the first sealing ring 223 and the sliding rod 221 blocks the opening of the first part 1412 facing the second part 1413. At this point, the gas cannot continue to flow in a direction toward the second part 1413 to prevent gas leakage.

Figure 12:
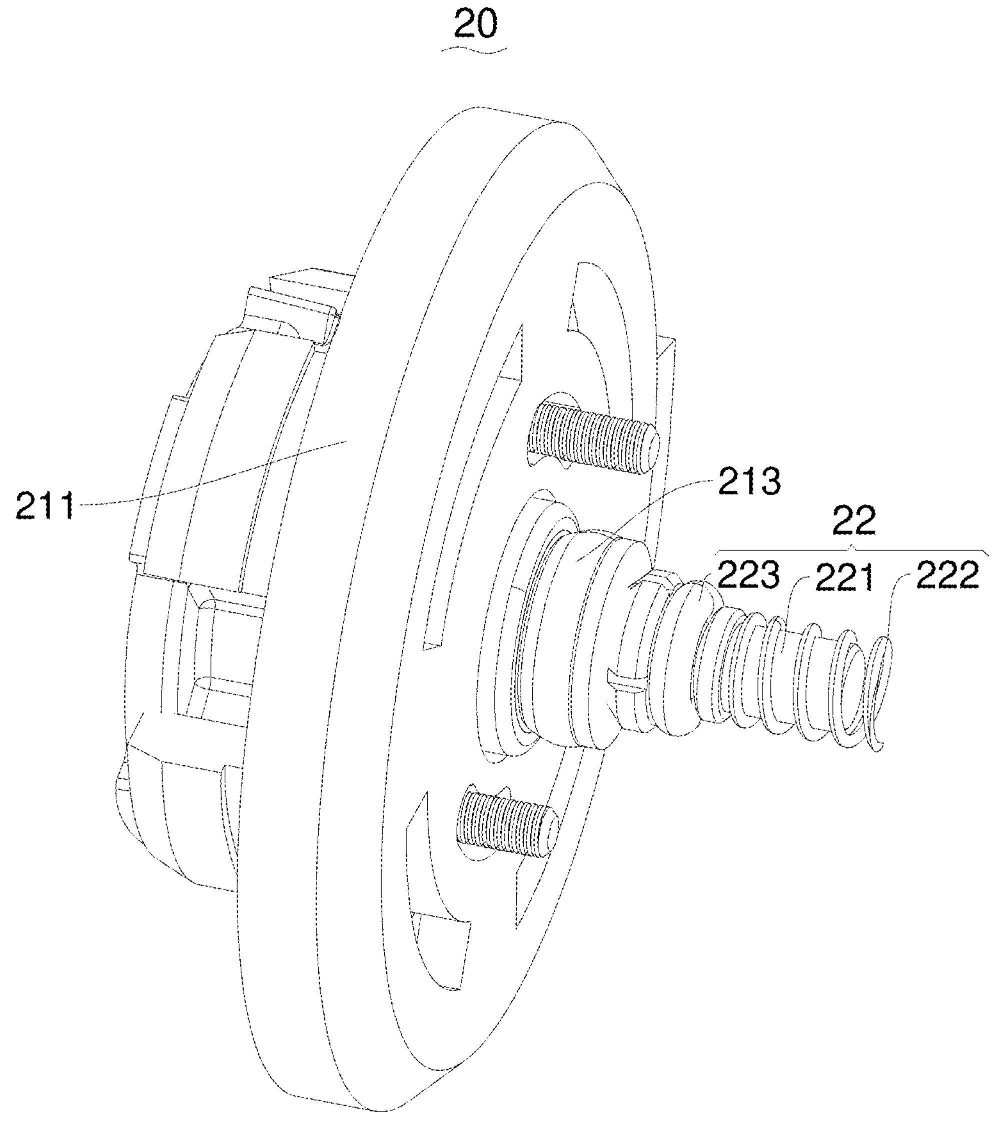
FIG. 12 is a schematic structural diagram of the first communicating structure in FIG. 5.
Figure 13:
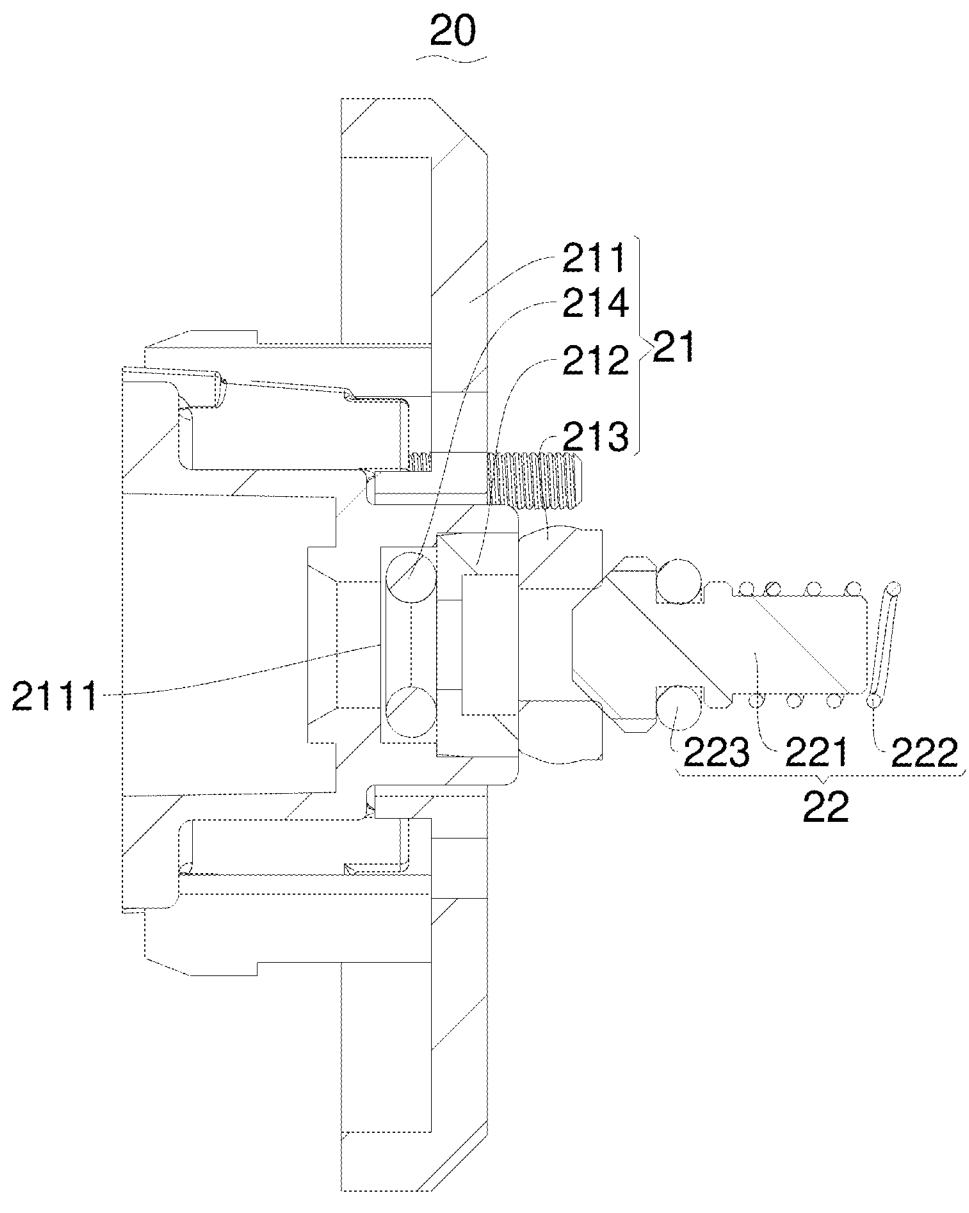
FIG. 13 is a schematic diagram illustrating a sectional view of the first communicating structure in FIG. 12.
Figure 14:
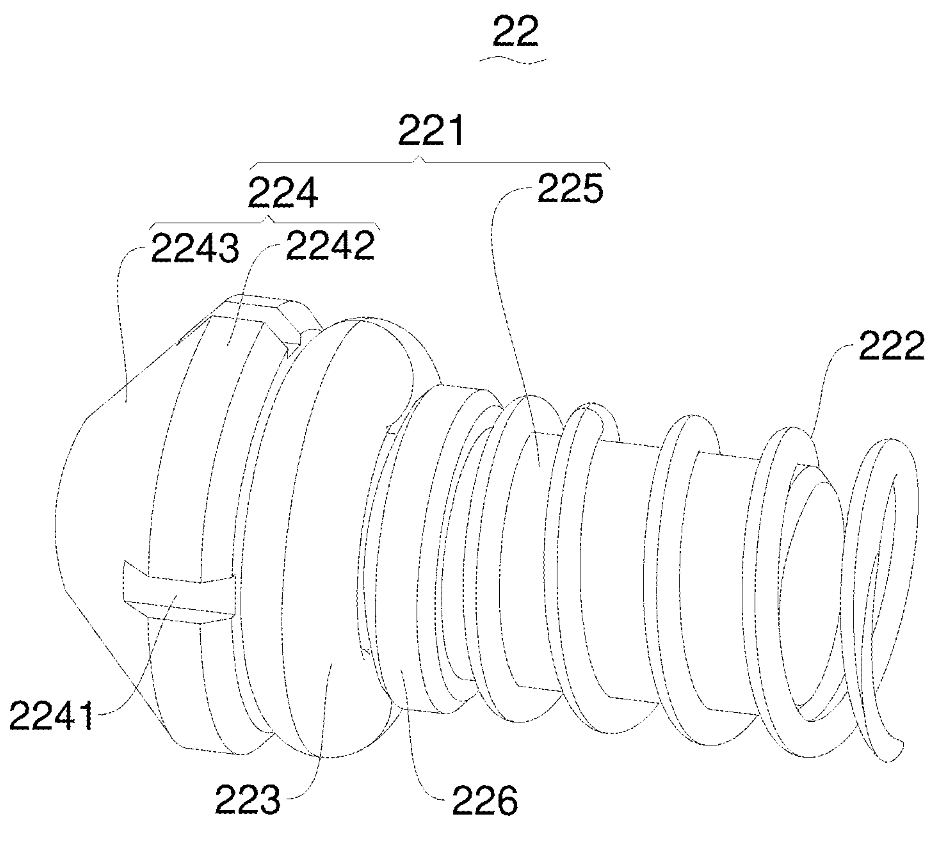
FIG. 14 is a schematic structural diagram of the sealing assembly in FIG. 12.

Specifically, referring to FIGS. 12 to 14, according to the present embodiment, the sliding rod 221 includes an abutment head 224 and a rod part 225, a diameter of a side of the abutment head 224 facing the rod part 225 is greater than that of the rod part 225, the abutment head 224 is slidably provided within the first part 1412, the rod part 225 is slidably provided within the first part 1412, the rod part 225 is provided with a limit ring 226, the first sealing ring 223 is snapped between the abutment head 224 and the limit ring 226, and the first elastic member 222 abuts between the limit ring 226 and an end of the second part 1413. In such an arrangement, by snapping the first sealing ring 223 between the abutment head 224 and the limit ring 226, the mounting of the first sealing ring 223 is achieved, and the mounting of the first elastic member 222 is achieved by setting the limit ring 226.

The abutment head 224 is slidably provided in the first part 1412, and a diameter of the rod part 225 is less than an inner diameter of the first part 1412 and the second part 1413. It is to be understood that a clearance is present between the abutment head 224 and the chamber wall of the first part 1412 when the abutment head 224 slides within the first part 1412, and the gas in the first gas cylinder 200, when discharged, is able to flow through between the abutment head 224 and the chamber wall of the first part 1412, thereby flowing into the connecting opening 15 located in the second part 1413.

Further, since the abutment head 224 needs to be abutted against the connecting assembly 21 to achieve a seal of the first input port 12, an outer diameter of an end of the abutment head 224 facing the connecting assembly 21 is gradually decreased in a direction toward the connecting assembly 21. Thus, when the first gas cylinder 200 is not required for use, the elastic force of the first elastic member 222 pushes the abutment head 224 into the connecting assembly 21 to be able to be abutted against the inner wall of the connecting assembly 21 so as to realize the sealing. The abutment head 224 with decreasing outer diameter also serves as guiding. In other embodiments, it is also possible to provide the abutment head 224 with a constant outer diameter, which is also capable of realizing a sealing effect when the abutment head 224 and the connecting assembly 21 are abutted against each other.

Further, since gas needs to flow between the abutment head 224 and the chamber wall of the first part 1412, in order to ensure a smooth gas flow, the abutment head 224 is provided with a venting channel 2241 extending in an axial direction of the valve body 10. The abutment head 224 includes a constant diameter segment 2242 and a variable diameter segment 2243, the constant diameter segment 2242 is connected between the variable diameter segment 2243 and the rod part 225, an outer diameter of the variable diameter segment 2243 is gradually decreased in a direction toward the connecting assembly 21, and the constant diameter segment 2242 is provided with a venting channel 2241 extending in an axial direction of the valve body 10. Thus the variable diameter segment 2243 is abutted against the connecting assembly 21 to achieve a seal. Since the constant diameter segment 2242 is provided with the venting channel 2241, the gas is not only able to flow through the clearance between the abutment head 224 and the chamber wall of the first part 1412 but also flow through the venting channel 2241 so as to flow into the connecting opening 15, which ensures the flow volume of the gas and ensures the heat supply for the gas combustion.

Referring to FIG. 14, for facilitating the setting of the venting channel 2241, the venting channel 2241 is in communication with the constant diameter segment 2242, i.e., it is only necessary to open a notch at the constant diameter segment 2242, the venting channel 2241 can be formed, which is convenient to the formation of the venting channel 2241. In other embodiment, it is also possible to provide a constant diameter segment 2242 in such a way that a through-hole is provided along an axial direction of the valve body 10, and the through-hole is connected to the outer wall of the variable diameter segment 2243, so as to realize the gas circulation.

It is to be understood that, in order to ensure the flow volume of the gas, one or more venting channels 2241 may be provided along a peripheral direction of the abutment head 224, each of the venting channel 2241 is available for flowing the gas, thereby ensuring the flow volume of the gas.

Referring to FIGS. 7, 9, 12, and 13, showing a schematic structural diagram of the connecting assembly 21 of the embodiment of the present disclosure, the connecting assembly 21 includes an outer mounting member 211 and a second sealing ring 213, the outer mounting member 211 is connected to an end of the valve body 10 and configured to connect the first gas cylinder 200, the second sealing ring 213 abuts between the outer mounting member 211 and the inner wall of the first input port 12, and the second sealing ring 213 is configured to be abutted against the sealing assembly 22. That is, the second sealing ring 213 is configured to be abutted against the abutment head 224 of the plunger 32, so as to achieve a seal of the first input port 12 when the first gas cylinder 200 is not required for use. At the same time, by setting the outer mounting member 211 to achieve the mounting of the first gas cylinder 200. When the first gas cylinder 200 is inserted to the outer mounting member 211, the first nozzle 220 of the first gas cylinder 200 is abutted against the second sealing ring 213. As shown in FIG. 1, the gas is discharged to drive the sliding rod 221 to move, so as to achieve the discharge of the gas inside the first gas cylinder 200. At the same time, by setting the second sealing ring 213, the second sealing ring 213 is able to deform to be abutted against the abutment head 224, thereby achieving a seal on the first input port 12 when the gas inside the first gas cylinder 200 is not required.

The outer mounting member 211, when mounted with the first gas cylinder 200, may be connected in an insertion manner, or in a snap-fit manner, which is not limited herein. When mounting the first gas cylinder 200, referring to FIGS. 1 and 2, the first gas cylinder 200 includes a first body 210 and a first nozzle 220 provided on the first body 210, the first body 210 is connected to the outer mounting member 211, the outer mounting member 211 is provided with a feed-through hole 2111, and the first nozzle of the first gas cylinder 200 is inserted into the feed-through hole 2111 and abutted against the second sealing ring 213.

Specifically, as shown in FIG. 7, an inner diameter of the second sealing ring 213 is less than an orfice diameter of the feed-through hole 2111, so that the nozzle of the first gas cylinder 200 can be abutted against an end surface of the second sealing ring 213 after threading through the feed-through hole 2111.

As shown in FIG. 11, when mounting the second sealing ring 213, the valve body 10 is provided with a mounting notch 16, and the second sealing ring 213 is snap-fitted into the mounting notch 16.

Further, in order to mounting of the first gas cylinder 200 on the valve body 10, the connecting assembly 21 further includes an inner mounting member 212 and a third sealing ring 214, the inner mounting member 212 is provided on the chamber wall of the feed-through hole 2111 and configured to be sleeved outside a port of the first gas cylinder 200, the third sealing ring 214 and the second sealing ring 213 are provided at two opposite sides of the inner mounting member 212 respectively, and the third sealing ring 214 is configured to sleeved outside the first nozzle 220 to limit the first nozzle 220. In such an arrangement, since the second sealing ring 213 and the third sealing ring 214 are both flexible and prepared of a material with elasticity, the inner mounting member 212 prepared of metal material need to be provided between the second sealing ring 213 and the third sealing ring 214, so as to be abutted against them when the second sealing ring 213 and the third sealing ring 214 are deformed. The gas may flow out through a space between the first nozzle 220 and the chamber wall of the feed-through hole 2111 after the gas from the first nozzle 220 is discharged, and a seal can be achieved by setting the third sealing ring 214 to prevent the gas leakage.

Figure 3:
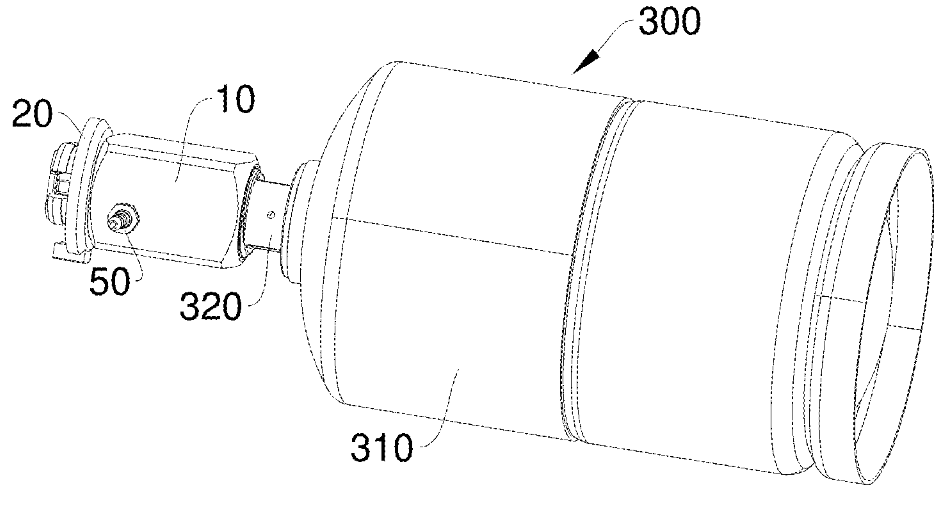
FIG. 3 is a state of use reference diagram of the second gas cylinder of the embodiment in the present disclosure.
Figure 4:
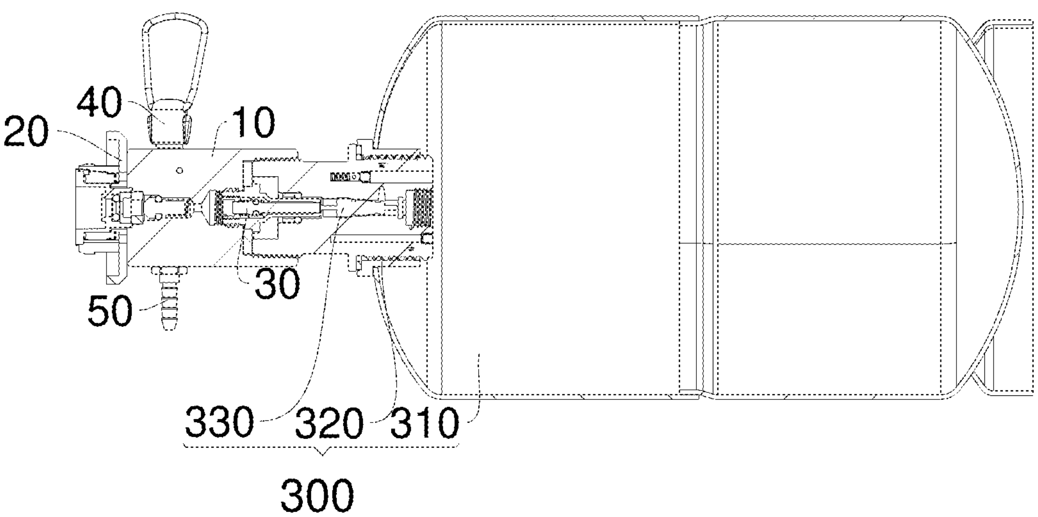
FIG. 4 is a schematic diagram illustrating a sectional view of the second gas cylinder and the connecting valve in FIG. 3.
Figure 5:
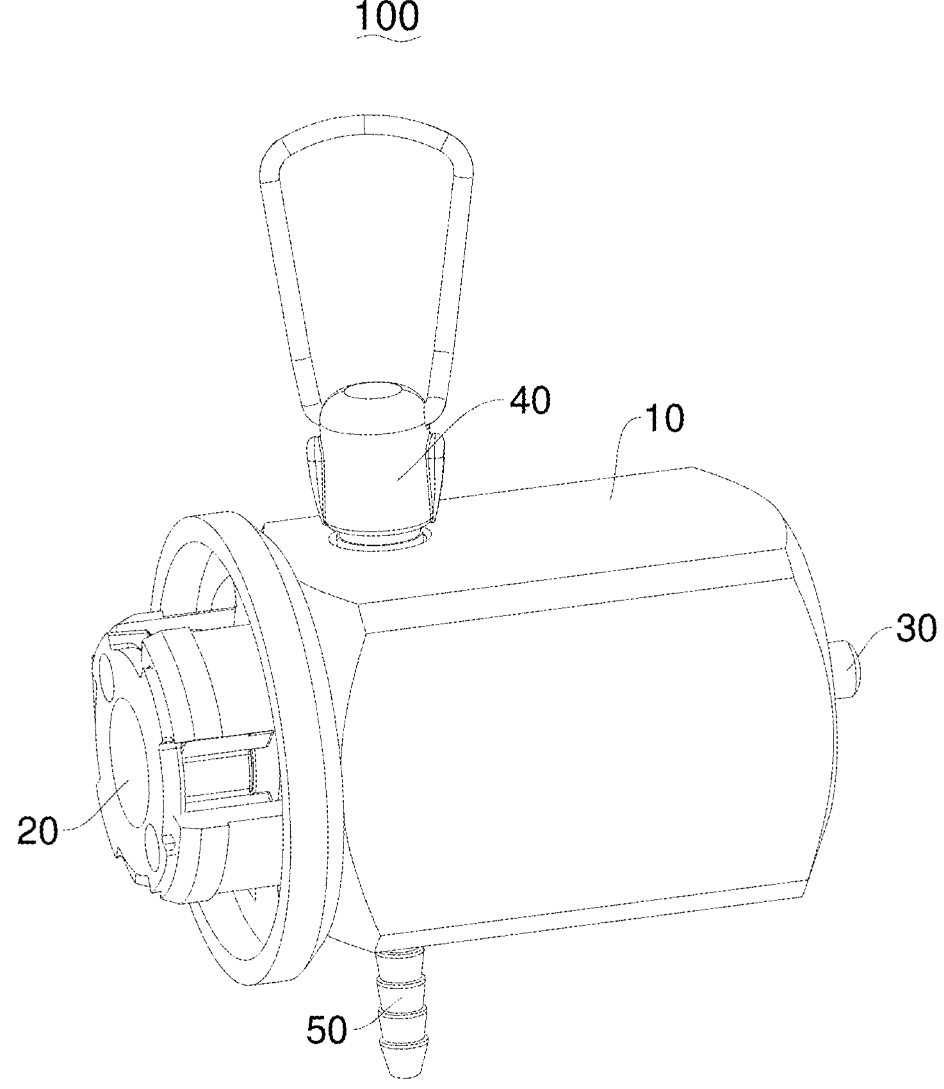
FIG. 5 is a schematic structural diagram of a connecting valve of the embodiment of the present disclosure.
Figure 6:
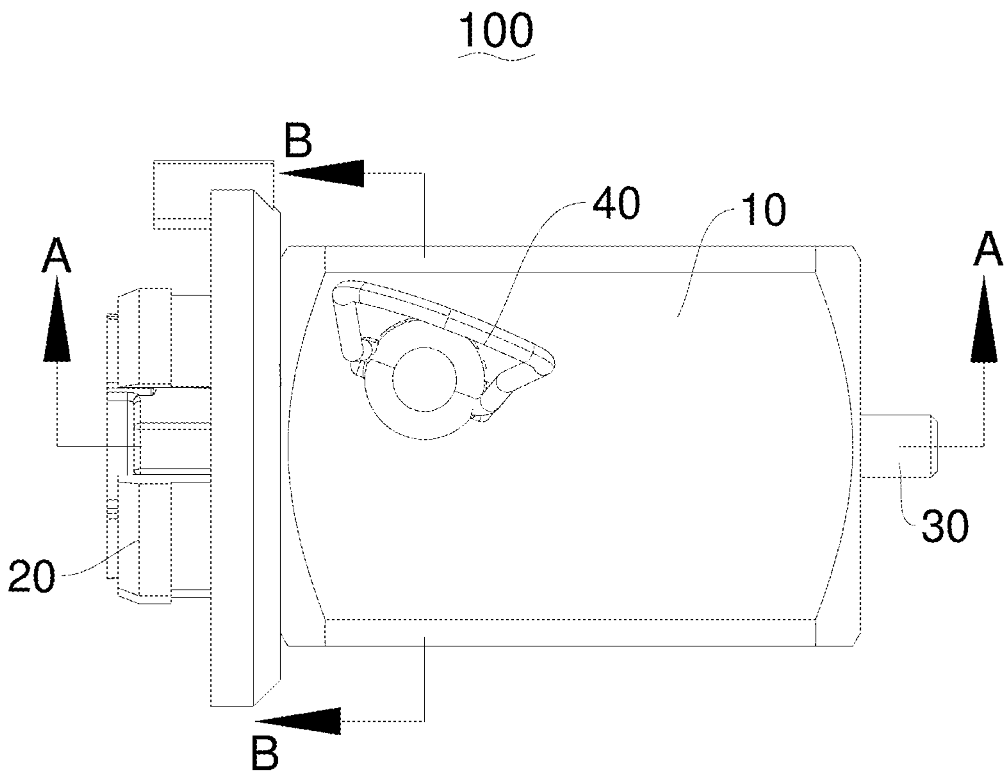
FIG. 6 is a top view of the connecting valve in FIG. 5.

Referring to FIGS. 3 and 4, according to the present embodiment, the second gas cylinder 300 includes a second body 310, a second nozzle 320 provided on the second body 310, and an airtight core 330 slidably provided inside the second nozzle 320. Referring to FIGS. 7, 9, 15, and 16, showing the schematic structural diagram of the second communicating structure 30 of an embodiment of the present disclosure, the second communicating structure 30 includes a connecting member 31, a plunger 32, a second elastic member 33, and a fusing member 34, the connecting member 31 is connected to the valve body 10 and is configured to connect to the second nozzle 320 of the second gas cylinder 300, the plunger 32 is slidably provided with respect to the connecting member 31 and the fusing member 34, the second elastic member 33 abuts between the fusing member 34 and the plunger 32 and configured to apply an elastic force to the plunger 32, and the fusing member 34 is configured to fuse when an ambient temperature is greater than a preset temperature, so that the plunger 32 is capable of moving towards a central direction of the valve body 10, so as to achieve blocking of the venting of the second gas cylinder 300. Therefore, by the setting of the fusing member 34, the fusing member 34 may fuse due to a temperature of the fusing member 34 is increased to be greater than a fusing point of the fusing member 34 when an outside ambient temperature around the entire connecting valve 100 is too high. As a result of the fusing of the fusing member 34, the plunger 32 is able to move in a direction of the first communicating structure 20 under a pushing force, and the plunger 32 is not able to continue to hold against the airtight core 330 in the second gas cylinder 300 under an elastic force, gradually disengaging from the airtight core 330 in the second gas cylinder 300. Consequently, the airtight core 330 is reset and the gas in the second gas cylinder 300 cannot continue to be discharged, i.e., the venting of the second gas cylinder 300 is blocked, so as to achieve the fusing protection.

It is to be understood that, the fusing member 34 in the present embodiment is a plastic member to be able to fuse at high temperatures.

According to the present embodiment, the connecting member 31 is in a threaded connection with the valve body 10 at the second input port 13 of the valve body 10, an inner wall of the third segment 143 of the circulation chamber 14 is provided with a first inner thread 1432, the connecting member 31 is provided with a first outer thread 311, and the first inner thread 1432 is connected to the first outer thread 311 to achieve the mounting of the connecting member 31. Further, since the plunger 32 needs to be completely detached from the airtight core 330 to realize the blocking of the venting of the second gas cylinder 300, in order to ensure the protective effect of fusing, a length of the inner threaded segment is set to be greater than a length of the outer threaded segment of the connecting member 31. Thus, a side of the inner threaded segment towards the second segment 142 is still remaining to enable the second elastic member 33 and the plunger 32 to continue in a direction of the second segment 142 after the fusing member 34 is fused, to achieve a complete disengagement between the plunger 32 and the airtight core 330, and to ensure the protection of the fusing.

Further, when mounting the fusing member 34 with the connecting member 31, the fusing member is in a threaded connection with the connecting member 31. Specifically, an outer wall of the fusing member 34 is provided with a second outer thread 341, an inner wall of the connecting member 31 is provided with a second inner thread 312, and the second outer thread 341 is connected to the second inner thread 312 to achieve the mounting of the fusing member 34.

Figure 15:
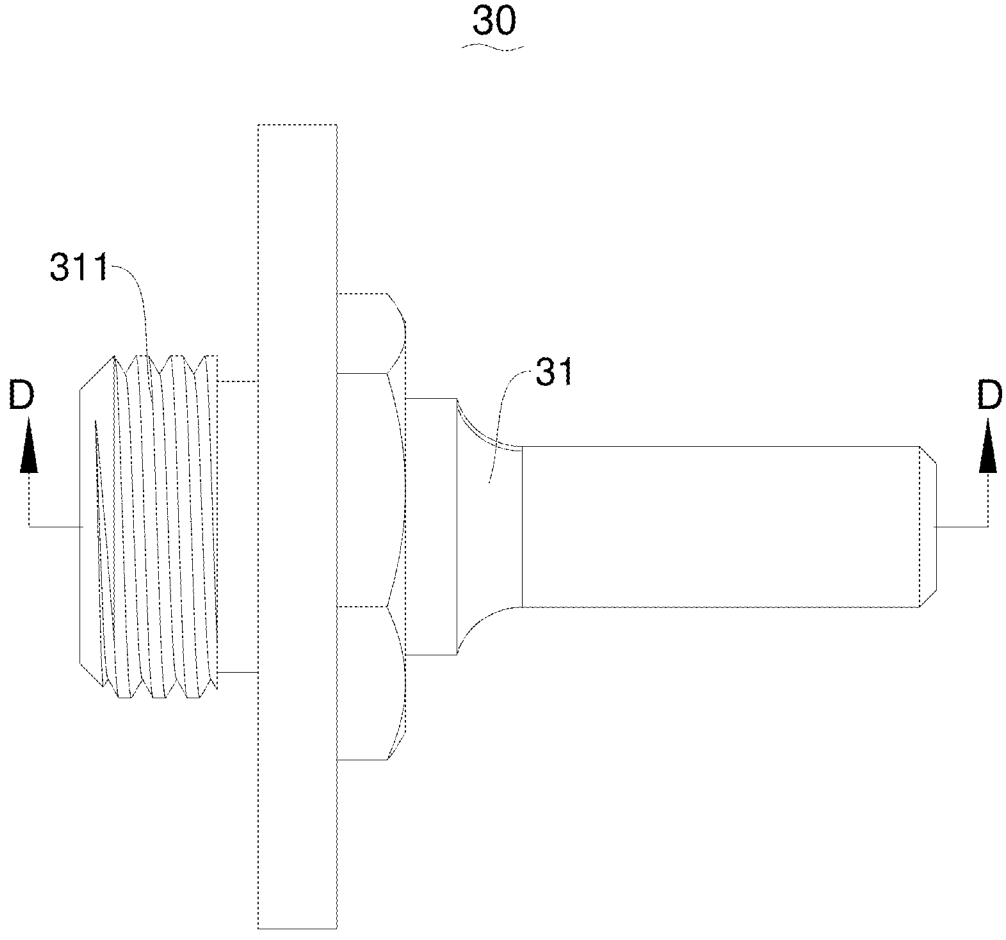
FIG. 15 is a schematic structural diagram of the second communicating structure in FIG. 5.
Figure 16:
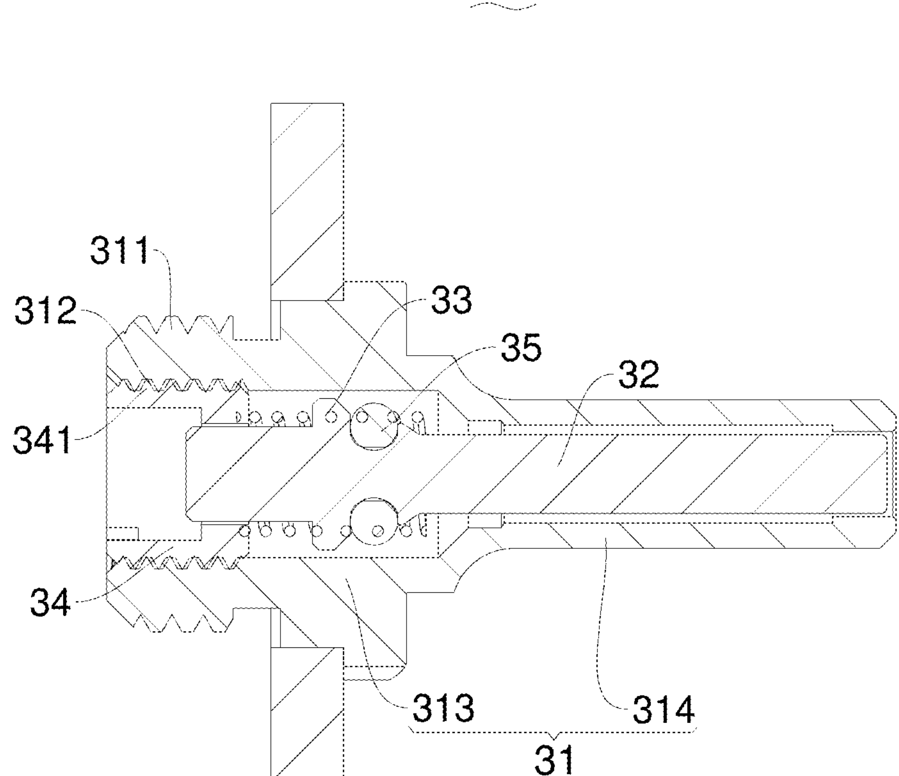
FIG. 16 is a schematic diagram illustrating a sectional view of the second communicating structure in FIG. 15.

Referring to FIGS. 15 and 16, showing the schematic structural diagram of the connecting member 31 of the present embodiment, the connecting member 31 includes a mounting segment 313 and a connecting segment 314, the mounting segment 313 is connected to the valve body 10, the connecting segment 314 is configured to connect the second gas cylinder 300, a diameter of the mounting segment 313 is greater than that of the connecting segment 314. Specifically, the connecting segment 314 is configured to connect to the second nozzle 320. The second communicating structure 30 further includes a fourth sealing ring 35, and the fourth sealing ring 35 is sleeved outside the plunger 32 and configured to be abutted against an end of the mounting segment 313 facing the connecting segment 314. In such an arrangement, when the second input port 13 are not in use, the fourth sealing ring 35 is abutted against an end surface of the mounting segment 313 facing the connecting segment 314 under the action of the elastic force of the second elastic member 33, so as to achieve a seal. When mounting the fourth sealing ring 35, a groove may be provided on the plunger 32 to limit the mounting of the fourth sealing ring 35.

Referring to FIGS. 2-9, in order to achieve the on-off of the gas supply of the connecting valve 100 and the combustion appliance, the connecting valve 100 further includes a switch structure 40 and a connection plug 50, the switch structure 40, configured to open or close the connecting opening 15 between the gas output channel 11 and the circulation chamber 14, is provided on an end of the gas output channel 11, the connection plug 50, configured to connect with the combustion appliance, is provided on an opposite end of the gas output channel 11. Therefore, when the switch structure 40 opens the connecting opening 15 after the connection plug 50 is connected to the combustion appliance, the gas provided from the first gas cylinder 200 or the second gas cylinder 300 can be directed to the combustion appliance by the connection plug 50.

The switch structure 40, which achieves opening or closing of the connecting opening 15, may be a plug valve structure, i.e., it relies on the rotation of the plug body around the centerline for the purpose of opening and closing, or it may be a ball valve structure, in order to control the on-off of the gas through the movement of the ball, which is not limited herein.

The aforementioned connecting valve 100 is used in the following manner: when the gas is delivered through the first gas cylinder 200, the plunger 32 in the second communicating structure 30 drives the fourth sealing ring 35 to be abutted against the end portion of the mounting segment 313 under the elastic force of the second elastic member 33, thereby achieving a seal on the second input port 13. The gas in the first gas cylinder 200 generates a push force on the first elastic member 222 and the sliding rod 221, and the sliding rod 221 moves in a direction towards the second input port 13, compressing the first elastic member 222, at which time the gas in the first gas cylinder 200 is able to flow into the connecting opening 15 through the clearance between the abutment head 224 and the chamber wall of the circulation chamber 14, so as to be delivered out of the connection plug 50 provided at the gas output channel 11. When the gas is delivered through the second gas cylinder 300, the second gas cylinder 300 is mounted on the valve body 10, and under the action of the elastic force of the second elastic member 33, the plunger 32 opens the airtight core 330, and the gas in the second gas cylinder 300 flows into the circulation chamber 14 through the clearance between the plunger 32 and the inner wall of the connecting member 31, flows into the connecting opening 15 after flowing through the second segment 142 sequentially, and is finally delivered out through the connection plug 50 provided at the gas output channel 11. That is, the connecting valve 100 of the present embodiment can be adapted for use with different gas cylinders, which is of more utility.

Provided in another embodiment of the present disclosure is further a combustion appliance including the aforementioned connecting valve 100, in which the combustion appliance can be a heating mechanism such as a gas stove.

The technical means disclosed in the solution of the present disclosure are not limited to those disclosed in the embodiments mentioned above but also include technical solutions consisting of any combination of the above technical features. It should be noted that for those skilled in the art, multiple improvements and modifications may be made without departing from the principles of the present disclosure. These improvements and modifications are also considered to be within the scope of protection of the present disclosure.

The invention claimed is:

1. A connecting valve, comprising:

a valve body, provided with a gas output channel, a first input port, a second input port, and a circulation chamber, wherein the gas output channel is in communication with the circulation chamber through a connecting opening, and the first input port and the second input port are located at two ends of the circulation chamber along an axial direction of the valve body;

a first communicating structure, comprising a connecting assembly and a sealing assembly, wherein the connecting assembly, configured to be connected with a first gas cylinder, is provided at the first input port of the valve body, the sealing assembly, configured to seal the first input port, is slidably provided with respect to a chamber wall of the circulation chamber and the connecting assembly, the first input port is capable of being opened by a gas pressure of the gas in the first gas cylinder, so that a first gas is delivered into the gas output channel; and a second communicating structure, mounted at the second input port, configured to connect a second gas cylinder, the second input port is capable of being opened by the gas pressure of the gas in the second gas cylinder, so that a second gas is delivered into the gas output channel.

2. The connecting valve according to claim 1, wherein the sealing assembly comprises a sliding rod and a first elastic member, the sliding rod is slidably provided with respect to the chamber wall of the circulation chamber and is configured to be abutted against the connecting assembly, so as to seal the first input port; and the first elastic member, configured to apply an abutting force to the sliding rod, abuts between the sliding rod and the chamber wall of the circulation chamber or between the sliding rod and the second communicating structure.

3. The connecting valve according to claim 2, wherein the circulation chamber comprises a first segment, a second segment, and a third segment that are in communication sequentially, an orifice diameter of the second segment is less than that of the first segment and the third segment respectively, the first segment is provided with a first input port, the third segment is provided with a second input port, the connecting opening is provided at any one of the first segment, the second segment, or the third segment, and the first elastic member is abutted against an end of the first segment.

4. The connecting valve according to claim 3, wherein the first segment comprises a first part and a second part, the first part comprises the first input port, a diameter of the first part is greater than that of the second part, the connecting opening is provided at any one of the second part, the second segment, or the third segment, the sealing assembly further comprises a first sealing ring, the first sealing ring is sleeved onto the sliding rod and configured to be abutted against an end of the first part connected to the second part when a gas pressure inside the first gas cylinder is greater than a preset value, so as to prevent gas from flowing to the connecting opening.

5. The connecting valve according to claim 4, wherein the sliding rod comprises an abutment head and a rod part, a diameter of a side of the abutment head facing the rod part is greater than that of the rod part, the abutment head is slidably provided within the first part, the rod part is slidably provided within the first part and the second part, the rod part is provided with a limit ring, the first sealing ring is snapped between the abutment head and the limit ring, and the first elastic member abuts between the limit ring and an end of the second part.

6. The connecting valve according to claim 5, wherein an outer diameter of an end of the abutment head facing the connecting assembly is gradually decreased in a direction toward the connecting assembly.

7. The connecting valve according to claim 6, wherein the abutment head comprises a constant diameter segment and a variable diameter segment, the constant diameter segment is connected between the variable diameter segment and the rod part, an outer diameter of the variable diameter segment is gradually decreased in a direction toward the connecting assembly, and the constant diameter segment is provided with a venting channel extending in an axial direction of the valve body.

8. The connecting valve according to claim 7, wherein the venting channel is in communication with the outer wall of the constant diameter segment.

9. The connecting valve according to claim 1, wherein the connecting assembly comprises an outer mounting member and a second sealing ring, the outer mounting member is connected to an end of the valve body and configured to be connected to the first gas cylinder, the second sealing ring abuts between the outer mounting member and the inner wall of the first input port, and the second sealing ring is configured to be abutted against the sealing assembly.

10. The connecting valve according to claim 9, wherein the first gas cylinder comprises a first body and a first nozzle, the outer mounting member is provided with a feed-through hole, the first body is connected to the outer mounting member, the first nozzle is threaded through the feed-through hole, the connecting assembly further comprises an inner mounting member and a third sealing ring, the inner mounting member is provided on the chamber wall of the feed-through hole and configured to be sleeved outside a port of the first gas cylinder, the third sealing ring and the second sealing ring are provided at two opposite sides of the inner mounting member respectively, and the third sealing ring is configured to sleeved outside the first nozzle.

11. The connecting valve according to claim 1, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

12. The connecting valve according to claim 2, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

13. The connecting valve according to claim 3, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

14. The connecting valve according to claim 4, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

15. The connecting valve according to claim 5, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

16. The connecting valve according to claim 6, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

17. The connecting valve according to claim 7, wherein the second communicating structure comprises a connecting member, a plunger, a second elastic member, and a fusing member, the connecting member is connected to the valve body and is configured to connect to the second gas cylinder, the plunger is slidably provided with respect to the connecting member and the fusing member, the second elastic member abuts between the fusing member and the plunger and configured to apply an elastic force to the plunger, and the fusing member is configured to fuse when an ambient temperature is greater than a preset temperature, so that the plunger is capable of moving towards a central direction of the valve body, so as to achieve blocking of the venting of the second gas cylinder.

18. The connecting valve according to claim 11, wherein the fusing member is in threaded connection with the connecting member.

19. The connecting valve according to claim 11, wherein the connecting member comprises a mounting segment and a connecting segment, the mounting segment is connected to the valve body, the connecting segment is configured to connect the second gas cylinder, a diameter of the mounting segment is greater than that of the connecting segment, the second communicating structure further comprises a fourth sealing ring, and the fourth sealing ring is sleeved outside the plunger and configured to be abutted against an end of the mounting segment facing the connecting segment.

20. A combustion appliance, comprising a connecting valve, wherein the connecting valve comprises:

a valve body, provided with a gas output channel, a first input port, a second input port, and a circulation chamber, wherein the gas output channel is in communication with the circulation chamber through a connecting opening, and the first input port and the second input port are located at two ends of the circulation chamber along an axial direction of the valve body;

a first communicating structure, comprising a connecting assembly and a sealing assembly, wherein the connecting assembly, configured to be connected with a first gas cylinder, is provided at the first input port of the valve body, the sealing assembly, configured to seal the first input port, is slidably provided with respect to a chamber wall of the circulation chamber and the connecting assembly, the first input port is capable of being opened by a gas pressure of the gas in the first gas cylinder, so that a first gas is delivered into the gas output channel; and a second communicating structure, mounted at the second input port, configured to connect a second gas cylinder, the second input port is capable of being opened by the gas pressure of the gas in the second gas cylinder, so that a second gas is delivered into the gas output channel.

* * * * *